US009417831B2

(12) United States Patent  
Evans et al.

(10) Patent No.: US 9,417,831 B2
(45) Date of Patent: Aug. 16, 2016

(54) METHOD AND SYSTEM OF PROVIDING COMPUTER NETWORK BASED LIMITED VISIBILITY SERVICE DISCOVERY

(71) Applicant: Tricerat, Owings Mills, MD (US)

(72) Inventors: David Evans, Towson, MD (US); Eric Musgrave, Ellicott City, MD (US)

(73) Assignee: Tricerat, Owings Mills, MD (US)

( * ) Notice: Subject to any disclaimer, the term of this patent is extended or adjusted under 35 U.S.C. 154(b) by 226 days.

(21) Appl. No.: 14/198,042

(22) Filed: Mar. 5, 2014

(65) Prior Publication Data

US 2015/0256404 A1   Sep. 10, 2015

(51) Int. Cl.
*G06F 15/173*    (2006.01)
*G06F 3/12*    (2006.01)
(Continued)

(52) U.S. Cl.
CPC ............ *G06F 3/1292* (2013.01); *G06F 3/1222* (2013.01); *G06F 3/1236* (2013.01); *G06F 3/1288* (2013.01); *G06F 3/1291* (2013.01); *G06K 15/4095* (2013.01); *H04L 41/5058* (2013.01); *H04L 63/10* (2013.01); *H04L 67/16* (2013.01)

(58) Field of Classification Search
CPC ....... H04L 12/24; H04L 41/12; H04L 47/808; G06F 3/12; G06F 63/1204; G06F 17/30899
USPC .......................................... 709/224, 226, 220
See application file for complete search history.

(56) References Cited

U.S. PATENT DOCUMENTS 7,636,584 B2   12/2009  Anderson et al.
7,941,504 B2   5/2011   Gershom
(Continued)

FOREIGN PATENT DOCUMENTS

WO    WO-02086712 A1    10/2002
WO    WO-2006115602 A1   11/2006
(Continued)

OTHER PUBLICATIONS

Mockapetris, P. "Domain Names—Implementation and Specification", Nov. 1987, pp. 1-56, http://tools.ietf.org/html/rfc1035.
(Continued)

*Primary Examiner* — Michael Y Won
*Assistant Examiner* — Normin Abedin
(74) *Attorney, Agent, or Firm* — Venable LLP; Jeffri A. Kaminski

(57) ABSTRACT

Computer networks can have excessively varied configurations, hence the ability to easily discover and access services within a networked computing environment has become indispensable to modern business. As a result, systems such as ZeroConfiguration (ZeroConfig) have been introduced to make services such as printing more seamless. ZeroConfig enables a service (such as a printing service) to be discovered in a straightforward manner to user devices wishing to use the service without any configuration on the part of a user or administrator. While this is advantageous in some environments, in others, service visibility becomes too widespread. Hence, a system and method is provided for controlled visibility service discovery and subsequent service execution. The system and method allow only authorized users to discover services from their user device using ZeroConfig as the underlying technology. In this way benefits of systems such as ZeroConfig can be maintained while providing service visibility control.

20 Claims, 10 Drawing Sheets

(51) Int. Cl.
  *H04L 29/08* (2006.01)
  *G06K 15/00* (2006.01)
  *H04L 12/24* (2006.01)
  *H04L 29/06* (2006.01)

(56) References Cited

U.S. PATENT DOCUMENTS

| | | | | |
|---|---|---|---|---|
| 8,891,106 | B1* | 11/2014 | Haapanen | G06F 3/1204 358/1.14 |
| 2003/0088681 | A1 | 5/2003 | Liscano et al. | |
| 2003/0151762 | A1* | 8/2003 | Cherry | G06F 21/608 358/1.14 |
| 2005/0086282 | A1* | 4/2005 | Anderson | G06F 17/30899 709/200 |
| 2006/0253330 | A1* | 11/2006 | Maggio | G06Q 30/02 705/14.2 |
| 2010/0027054 | A1* | 2/2010 | Reddy | H04L 29/02 358/1.15 |
| 2011/0151840 | A1 | 6/2011 | Gong et al. | |
| 2012/0019864 | A1 | 1/2012 | Mickeleit et al. | |
| 2012/0060025 | A1* | 3/2012 | Cahill | H04L 63/08 713/155 |
| 2012/0177041 | A1 | 7/2012 | Berman | |
| 2015/0100700 | A1* | 4/2015 | Ishvarchandra | H04L 61/10 709/228 |

FOREIGN PATENT DOCUMENTS

| | | |
|---|---|---|
| WO | WO-2009032396 A2 | 3/2009 |
| WO | WO-2010052523 A1 | 5/2010 |
| WO | WO-2011087592 A2 | 7/2011 |

OTHER PUBLICATIONS

Cheshire S. et al., "Dynamic Configuration of IPV4 Link-Local Addresses", May 2005, pp. 1-33, http://tools.ietf.org/pdf/rfc3927/pdf.

Cheshire S. et al., "Multicast DNS", Feb. 2013, pp. 1-71, http//tools.ietf/org/html/rfc6762.

"Zero-Configuration Networking", http//en.wikipedia.org/wiki/Zero-configuration networking.

"Bonjour for Developers", https//developer.apple.com/bonjour.

"Zero Config For Linux", http://avahi.org.

"Winpcap", http://www.winpcap.org.

* cited by examiner

METHOD AND SYSTEM OF PROVIDING COMPUTER NETWORK BASED LIMITED VISIBILITY SERVICE DISCOVERY

TECHNICAL FIELD

Embodiments of the present invention relate generally to interconnectivity among digital systems and peripheral devices. More particularly embodiments of the invention relate to a system and method which manages service visibility and allows end user devices to use the service from their device, when authorized to view or use that service.

BACKGROUND OF THE INVENTION

The embodiments described in the following section are not necessarily embodiments that have been previously conceived or pursued. Therefore, unless otherwise indicated, it should not be assumed that any of the embodiments described herein qualify as prior art merely by virtue of their inclusion.

Computer systems have a plethora of configurations, and the ability to print within a networked computing environment has become indispensable to the modern business. Electronic devices such as desktop computers, tablet computers, personal digital assistants (PDAs), and smart phones are tools which enable the user to access and create electronic content. It is sometimes useful to turn the information into a printed tangible form.

Unfortunately existing providers of both printers and printing services have tended to be limited in their offerings, often allowing only certain applications and file types to print in specific, limited configurations. Moreover, adaptability to some tablets, PDAs, smart phones, and other mobile devices has been previously unavailable without the advantages and features of embodiments of the present invention.

Conventional printers, and associated printing techniques, typically involve the installation of a print driver on an operating system or platform of an associated computer. However, protocols such as AirPrint by Apple Inc. have been introduced which enable printing without the need for an independent printer driver. The protocol utilizes a service advertisement methodology which enables services (such as printing to a printer) to be presented to users in an unrestricted, global manner. Hence printers may be shared within local area networks (LANs) and in some cases other networked architectures. While this is advantageous in some environments, in other environments service visibility becomes too widely cast. For example, for AirPrint enabled printers once the printer is made available to the network all users can discover and use the printer. Hence, given the above limitations of current AirPrint (and similar) protocols, there is a need for improved service discovery in existing networked environments.

Visibility Control and Reduced Network Traffic

As stated above Apple Inc. has introduced a protocol known as AirPrint, which is a native feature of Apple's mobile device operating systems and supports printing via a wireless network to any AirPrint compatible printer. At its core AirPrint uses Bonjour for service discovery (e.g. printer discovery), which is Apple's implementation of ZeroConfiguration (ZeroConfig). ZeroConfig is a low level network specification that publishes various types of services (including print services) over a local network. ZeroConfig enables a service to announce itself in a simple, easy to understand, and unique name based manner to devices wishing to use the service without any configuration on the part of the user or an administrator. While this is practical on smaller networks, typically less than a thousand users, where security and network traffic volume are not issues, it is impractical for larger, enterprise level networks. For larger networks, such as those used by businesses, the protocol creates an environment where all services are globally visible, without restriction. Also the protocol, due to its nature to broadcast messages as well as provide periodic service status, may generate excessive network traffic.

In terms of global service visibility, ZeroConfig creates a framework of broadcasted, global service requests and advertisements. This results in ZeroConfig's inability to filter and control visibility over a network. For example, a chief executive officer may want the ability to print to their printer from their device only (i.e. for iOS/OS X devices, only they can see the printer as an option on their AirPrint menu while no one else can see that printer on theirs). ZeroConfig does not allow this controlled visibility since it takes an all or nothing approach due to its broadcasted method.

In regard to network traffic, bandwidth could also become hampered with uncontrolled services sending multicast messages to devices on the network. In other words, Apple's Bonjour is constantly sending out network traffic and because of this some administrators disable the Bonjour feature on printers and other Bonjour capable devices.

Accordingly, the current state of printers and printing environments provide an uneven, resource intensive, unpredictable user experience, which has been less than ideal. More importantly, previous solutions directed towards an attempt to solve these issues lack service visibility control (for given environments) Hence, there exists a need to have a networked, multiple device system that allows any device to see and use services such as printing (when registered, found, or shared within the network) only when the user is authorized to do so.

SUMMARY OF THE INVENTION

According to exemplary embodiments of the subject application, a system and method are provided for supplying service discovery to a user device to allow service visibility and use of any authorized service connected to the device's network. The user can first take his or her device (such as an iPAD) and log into wherever they purchase applications. Upon logging into the store the user downloads an agent application onto their device. The agent application, once installed and configured, allows selected users to see authorized, available services (such as printing services). Subsequently, when services such as printing are desired by the user using a native print interface, only the authorized printers are visible to the user.

Embodiments of the invention provide a method of providing computer network based limited visibility service discovery comprising disabling a broadcast function of a service device when the service device includes a broadcast service advertisement function. A service is configured to be recognized by a server via an initial service discovery request. The server is directed to wait for a subsequent service discovery request from a user device. Upon receipt of the subsequent service discovery request, the server verifies that the requesting user device is authorized or not authorized to view services available via the network. A response to a user device service request based on a result of the authorization check, where a response is sent from the server to only the said requesting user device if authorized to view the service, and a response is not sent to said requesting user device if not authorized to view the service. Upon receipt of user selection of the service to be executed, the service request is processed with a service handler by receiving, processing, and forwarding the request to a service device or further service forwarding device.

In another embodiment, a system for providing computer network based limited visibility service discovery comprises a processor; a memory; one or more service devices which have their broadcast service discovery function disabled for the service devices that include a multicast service advertisement function; a configuring unit which configures one or more services to be recognized by a server via an initial service request; a directing unit which directs the server to wait for a subsequent service discovery request from a user device; a checking unit which, once a request is received, checks if the requesting user is authorized or is not authorized to see one or more services available via the network; a responding unit which responds to one or more user service requests based on the result of one or more user authorization checks; and a receiving unit that, upon user selection of the service to be executed, processes the service request with a service handler by receiving, processing, and forwarding the request to a service device or further service forwarding device.

The details of one or more implementations are set forth in the accompanying drawings and the description below. Other features will become apparent from the descriptions, drawings, and claims.

DETAILED DESCRIPTION

Figure 1:
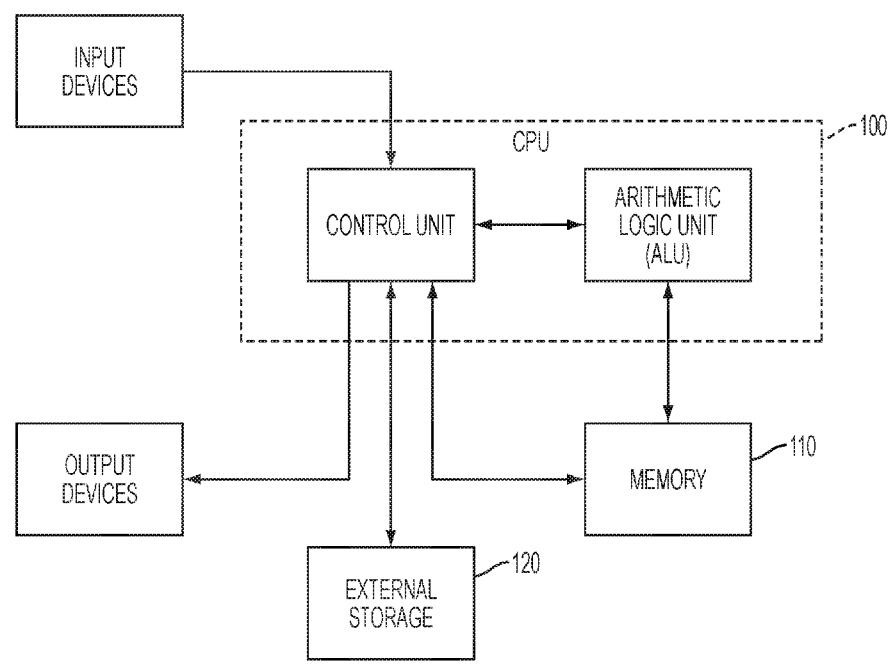
FIG. 1 is a device hardware diagram.

Example embodiments of the invention are discussed below. While specific example embodiments are discussed, it should be understood that this is done for illustration purposes only. For example, embodiments of the invention are discussed in the context of printer services, but the invention is applicable to all services.

In order to accomplish this, the user device can first send an initial broadcast service discovery (SD) request over the network in order to set up the system. This is considered an initial service discovery phase. Once the user device sends the SD request the services can, if available, identify themselves to the agent on the user device. The user device in turn forwards the identified services to a central server for processing. Once processed, the server will be aware of the services and can act in place of the service itself (for the purposes of service discovery and visibility). The above setup can also be accomplished in other ways, including for example where the server itself drives the setup process, or where preexisting services have been configured and drawn from the server and other sources.

Once setup is complete the user may subsequently decide to use a particular service, where a second service discovery process is then executed. To accomplish this the user device again sends a broadcasted, multicast service discovery request over the network. Upon receiving the request, the server checks security policies and assignments and, in response, sends available services directly to the user device. Service devices themselves would, at this point in the process, have discovery protocols such as Airprint disabled in order to prevent a direct response from the device. The user is then able to see the list of available, authorized services (e.g. printers) currently associated with the user's account.

In a further embodiment, the server may announce the service to the authorized user's device instead of responding to a broadcasted, multicast service discovery request. This announcement may be sent directly to the user's device, for example via directed multicast to that user's device. (Not shown in the diagrams).

In the case where the service is local to a specific workstation, once logged by the central server (which can either be public and in the cloud or private) the print job, for example, is received by the server and is forwarded to a printer's machine, then forwarded to the printer.

Whether a network or local service, the available and authorized service devices on the device server (such as a print server) are published using a protocol similar to Apple's AirPrint. This enables only the authorized user to see their available services and, if permitted, allow the user to use the service (such as printing to their desired printer). Therefore, the system according to an exemplary embodiment of the invention can provide, when needed, selective service visibility for native printing through, for example, iOS/OS X applications to various authorized printers over a computer network. The system may have the ability to assign specific printers to specific users based on network administrator and other configurations.

Embodiments of the present invention may be laid upon a hardware architecture, for example as abstracted in FIG. 1. The system units including the configuring unit, directing unit, checking unit, and responding unit may be stored in a memory 110 and/or 120 and can be executed on a processing unit 100. Many configurations can be arranged in a similar manner as FIG. 1 to achieve a processing environment, and therefore the invention is not restricted to the hardware architecture as displayed in FIG. 1.

Figure 2A:
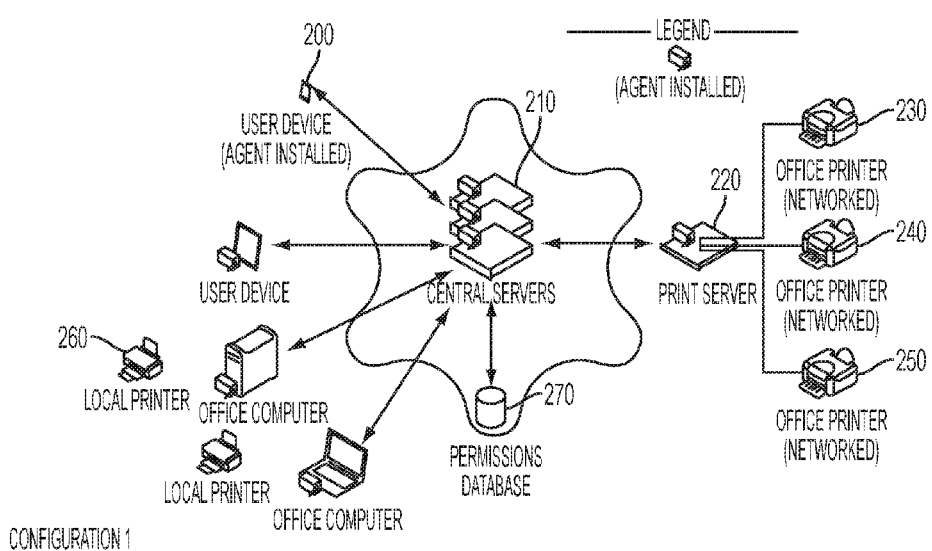
FIG. 2A-B are network architecture diagrams displaying the overall service discovery and printing system for two different configurations according to an exemplary embodiment of the invention.

According to embodiments of the subject application, the system and method provide control of service visibility on a computer network through setup, discovery, and service execution. Error! Reference source not found. displays an exemplary system architecture including service devices 230 and 240, user device 200, "hosted" or private central server 210, print server 220, and permissions database 250. In terms of configuration, the target service device (e.g. printer) can be connected directly to the network such as service devices 230-250 or connected locally to a computer which is then connected to the network such as service device 260. FIG. 2A displays both configurations.

Additional configuration steps may include the following. A service discovery protocol such as the airprint function on an otherwise airprint enabled printer is disabled, for example by a network administrator. Also an agent is provided on user device 200. The agent may be an application running on the user device 200. To obtain the application, the user logs into wherever they purchase applications, then purchases, downloads, and installs the application onto their device. Once the user runs the application the device is ready to communicate with central server(s) 210.

In one embodiment the server(s) 210 as well as print server 220 may already be set up in the system. Also, the application is meant to detect service devices (e.g. printers) whenever they may come online, hence the order of steps can vary. Finally, while the embodiments of the present invention includes various types of services, the described embodiments use a printing service as an example.

Figure 2B:
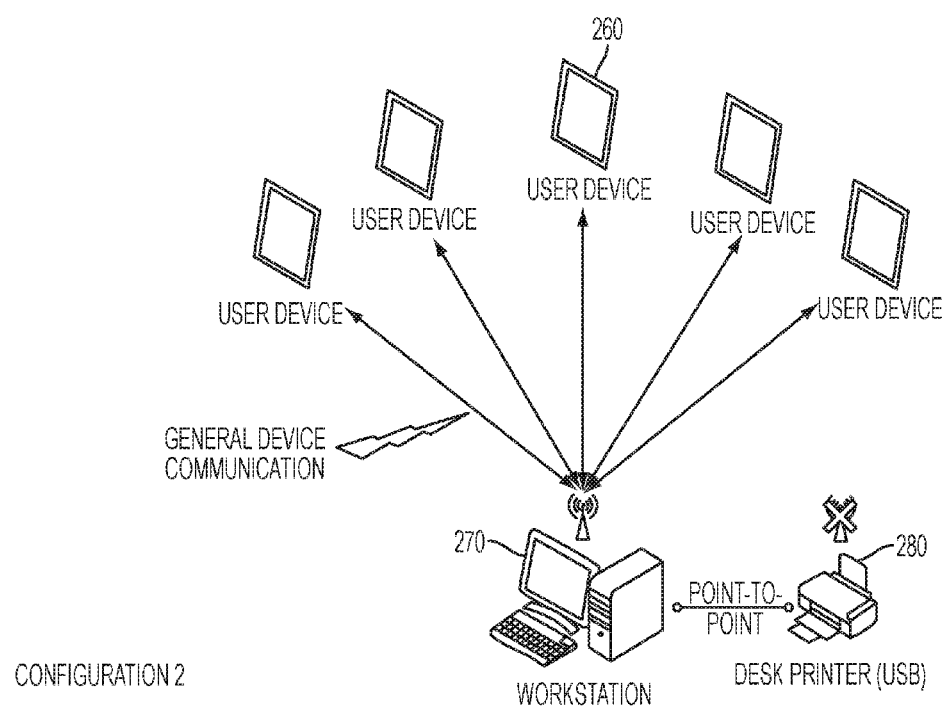

While the network printer scenario described in connection with FIG. 2A may be most common, the printer connections can be rearranged in the network to an alternate embodiment as shown in FIG. 2B. In other words all of the server and database functions could be implemented on workstation 270 with local printer 280 attached instead. In this scenario the communication between user device 260 and workstation 270 does not change, but the printer may be connected over a local Universal Serial Bus (USB) link rather than a network link. Consequently the user device must rely on the workstation to discover and communicate with a printer because the Airprint function of the printer has been turned off. Also the workstation 270 acts as a pass through device when the print job is actually executed.

Figure 3:
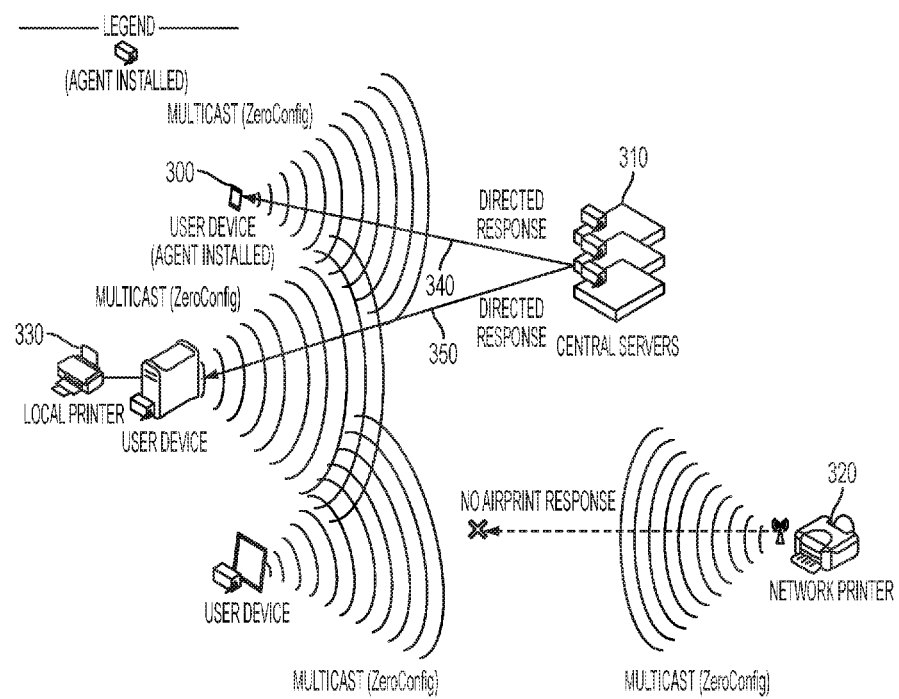
FIG. 3 is a communication diagram displaying server and multiple user device communication according to an exemplary embodiment of the invention.

Once set up, the system is ready for initial service discovery and by extension discovery of any devices supporting those services, as executed by a configuring unit. The configuring unit ensures that available network services are initially discovered, which in turn enables service availability for subsequent processing. The initial service discovery process begins when the agent on user device 300 issues a service discovery request (as shown in FIG. 3). The available printers respond with a Bonjour message to identify themselves to the agent. This response could be from a networked printer (such as printer 320) or from a computer residing on the network but with a locally connected printer (such as printer 330). Note that during initial service discovery any target service device need only rely on Apple's Bonjour to advertise its services. This would, as a result, mask its presence from Airprint service receivers (such as iOS/OS X devices).

Returning again to user device 300, once it sends the discovery message and gathers responses it will have a list of available printers residing on the network (as identified via Apple's Bonjour). The user device agent then forwards the list to server 210, or to a local workstation 410 if service management is being handled there, as with FIG. 4 (note that in the case of FIG. 4 the service information to the workstation will be redundant). The server or workstation then creates printer accounts the user may have the option to subscribe to.

Once services have been initially discovered, a user may be able to subscribe to those service(s). The subscription process allows a user to establish to the central server that the user wants the service to appear on their user device menu once they are ready to execute the service. For example, if a particular printer is discovered and appears in the user device agent application as "discovered", actually subscribing to the printer enables the central server to associate the user's identifier with the particular printer. Subsequently, when the user is ready to print a document, for example, the printer appears in the application's native print menu for selection. Successful subscription by a user is predicated on the security policies set in place by the system administrator, as described below.

Once network services are initially discovered successfully, the security process can be executed by a checking unit. The checking unit ensures that previously set permissions for a particular service are used to determine service visibility for a particular user. The server or workstation should have in place the previously set assignments and policies for how users are allowed to see and access a particular service (such as a printing service). Once the server or workstation receives a request from a user device to display printers in the user interface (UI) of the user device, the server or workstation starts the security process. The server or workstation first compares the requesting user's unique identifier to the permissions list of the printer. The printer permissions list and unique user identifier can be pre-set, for example by an administrator or by the processing system itself, and stored in a remote database (such as Microsoft Access, Microsoft SQL Server, International Business Machines DB2, Mongo, Oracle, SAP, etc.) or locally. If permissions are stored in a database the printer's permissions list is retrieved, compared to the requesting user's identifier, and allowed if the user is included in the printer permissions list. Otherwise the user's identifier is compared directly to the printer permission list to determine if a particular printer should be included in the authorized printer list. Finally, the authorized printer list is sent back to the user device for viewing, device selection, and subscription (if enabled based on permissions).

Figure 5:
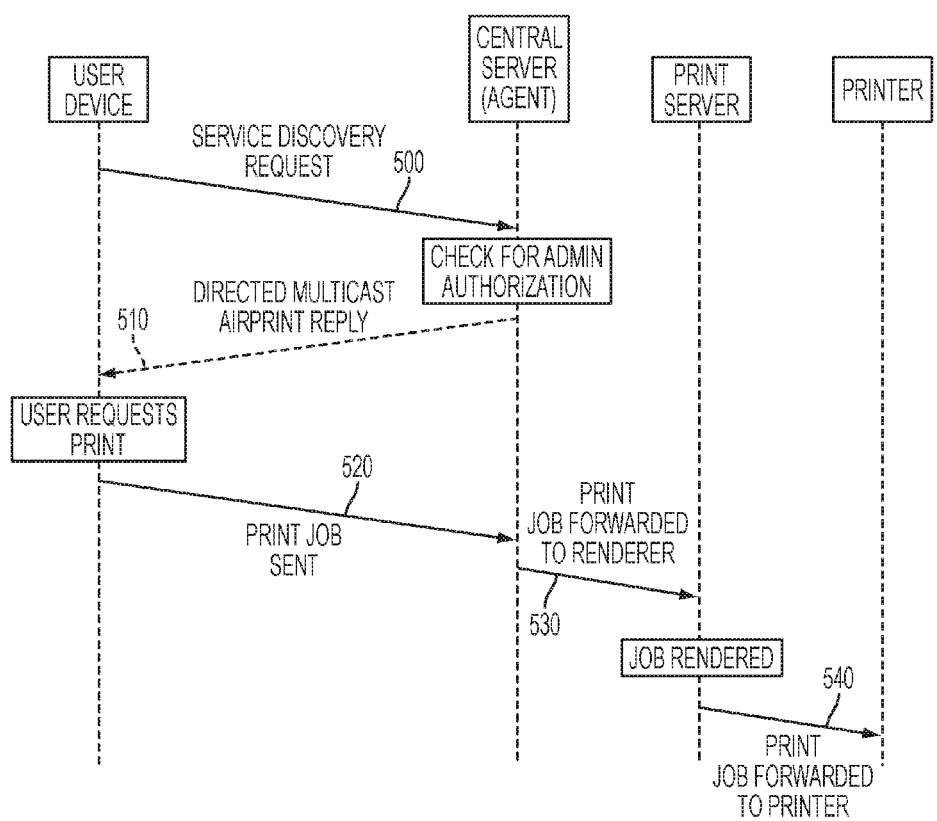
FIG. 5 is a message diagram displaying requests and responses from system components according to an exemplary embodiment of the invention.

Once initial subscription is complete, the process is ready to utilize the subsequent directed multicast service discovery system and method. This process begins at the user device as the user is ready to print or use another network service. In the case of a print service, the user will bring up the native print UI on the user device through any print enabled application. The user would then request a list of available printers from within the print UI. This prompts the user device operating system to send out a request 500 for available Airprint and other printers (as shown in FIG. 5). The request is a multicast service request directed to the network on which the central server resides. Hence the central server can detect the request and respond as the original service would have. In other words, while the Airprint functionality has been turned off on the network printers they are known to the server due to the initial discovery process described above. This enables the server to notify the requesting user device of a service rather than the service device itself performing the notification. At this point the central server is waiting, with a directing unit, for a service request (which can be request 500 generated by the user device). The directing unit directs the server to wait for this service request.

Figure 4:
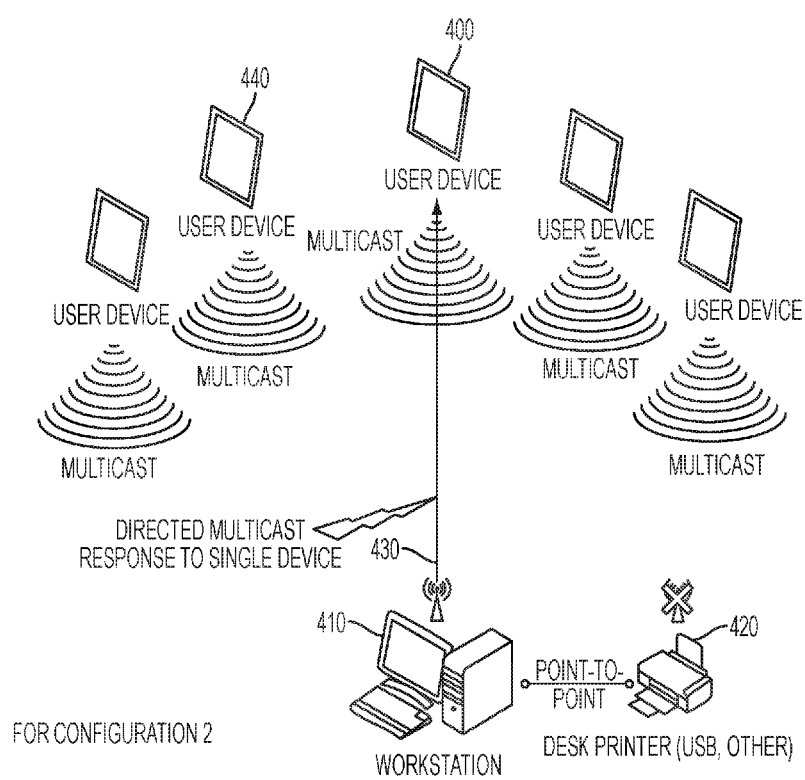
FIG. 4 is an alternate configuration communication diagram displaying workstation and multiple user device according to an exemplary embodiment of the invention.

Therefore the server side agent, once it detects a user device service request, responds to it with a packet using the user device specific MAC address as the destination address. This response 510, executed by the responding unit, notifies the user device operating system of print service names to display to the user. The response from the server also serves to notify only the requesting user device, as the packet contains the device specific MAC address rather than a multicast MAC address in the request. The server will respond only with printers the user is allowed to print to and/or see. Hence, the available printers are published in a directed multicast manner to the user device, for example over Apple's AirPrint protocol (as shown in FIG. 3, print discovery server response 340 and 350 and in FIG. 4, print discovery workstation response 430). Also, as shown in FIG. 3 and FIG. 4, this process can be repeated for as many user devices as are requesting services. This enables the user to both see the authorized available printers and select their desired printer to print a job. The directed multicast message also serves to reduce network bandwidth as responses would be sent one to one (i.e. server to user device) rather than one to many (i.e. server to multiple user devices).

Figure 6:
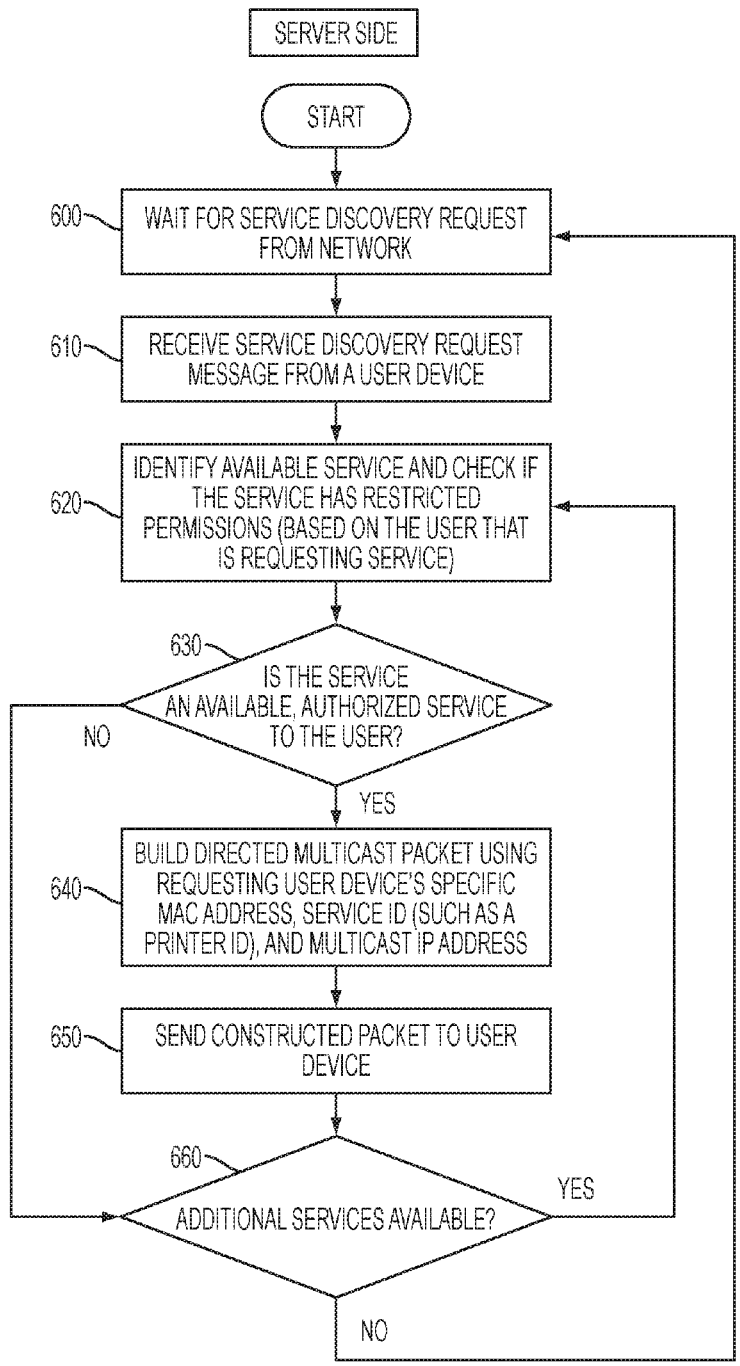
FIG. 6 is a flow of device functions operating on the server (the environment handling service discovery and print control) according to an exemplary embodiment of the invention.

Moving now to the exemplary server agent behavior displayed in FIG. 6, the figure outlines the process the server side agent follows to respond to a service discovery request by a user device. The following steps follow FIG. 6 where a packet is sent from the server in response to a multicast query from the user device requesting the service (such as a printing service).

The server side agent waits (block 600), then receives a query from a user device for a service type (block 610).

Internal to the agent, a Domain Name System (DNS) message handler captures the query and checks if it is publishing a service type that matches, and if so goes through a list of user devices to check if a response has already been sent.

The agent checks user permissions against the requesting user, in block 620, if the response has not yet been sent.

If there are available printers the user is authorized to see (block 630), the server side agent builds the response packet via a raw socket (block 640) and sends it to the user device (block 650).

The response is marked as sent, a check is made for any additional and available services (block 660) and the process flow proceeds accordingly.

Note that the packet is sent in response to a Domain Name Server-Service Discovery (DNS-SD) query from the device requesting service (such as an AirPrint request).

Figure 7:
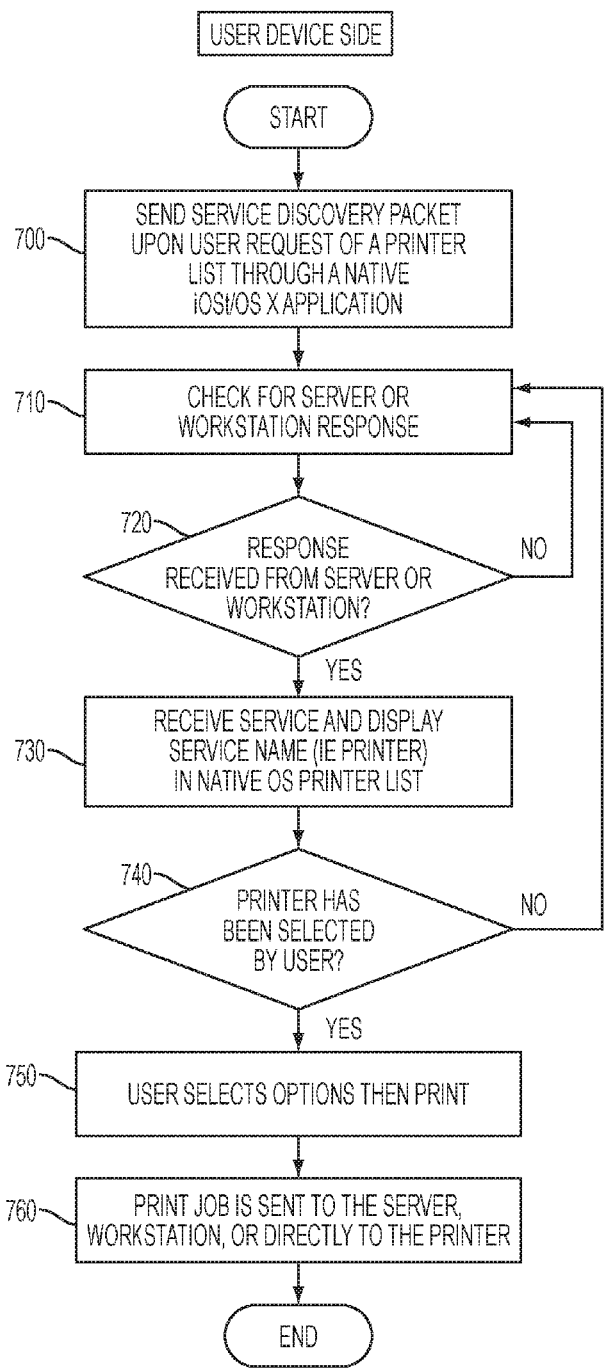
FIG. 7 is a flow of device functions operating on the end user device according to an exemplary embodiment of the invention.

Moving now to a more detailed example of user device behavior displayed in FIG. 7, the figure and following steps outline the process the operating system on the user device takes to initialize a service request (such as a print service). While these operations are considered native to the user device the data being received is distinct.

The user device requests a service (such as an Airprint service) from the network (block 700).

Listens for a response from the server (blocks 710, 720).

If a response is received, unpack the received service information and display to the user (block 730).

Wait for a service device to be selected (block 740).

Once the user selects a service device from the list (block 750) communication with the service provider (such as a server or printer itself) can proceed (for example a print job is sent to a printer, as reflected in block 760).

Figure 8:
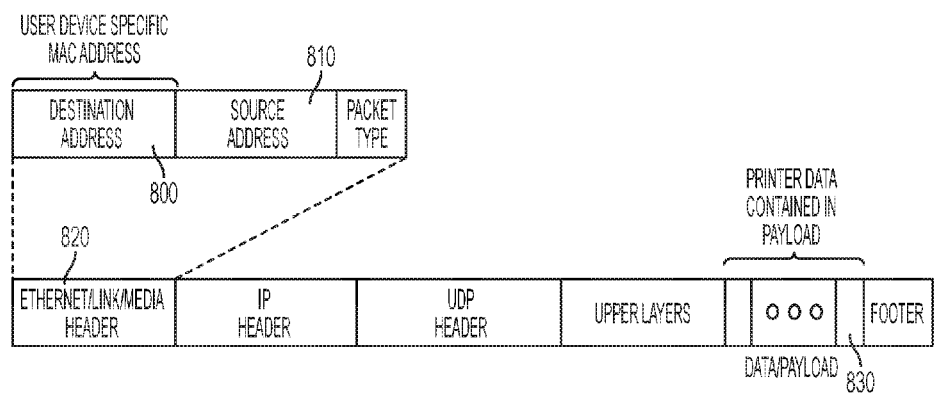
FIG. 8 is a network packet diagram showing an address modified Ethernet address in the Ethernet layer header according to an exemplary embodiment of the invention.

Transitioning now to low level packet manipulation, in an exemplary embodiment, Apple's Bonjour universal messaging as well as direct packet manipulation are utilized to accomplish service management. Referring now to FIG. 8, the server side agent takes MAC address field 800 and writes in a MAC address specific to the requesting user device (when responding to the device). The packet should include the source address 810 and the appropriate header 820. The printer information is contained in the payload 830 of the packet. While the printer information is typically readily available to the server (as in FIG. 8), the user device MAC address 800 is an exception. This MAC address can be captured, for example, in several ways:

1. Get the IPv4 to physical address mapping table, look for the matching IP.
2. When a user device initially logs into the central server have the user device include its MAC address as part of the login data, store for later user.
3. Obtain the MAC address directly from the multicast request packet, possibly with a tool such as WinPCap (a low level packet capture and transmission tool), when packet capture is available.

Figure 9:
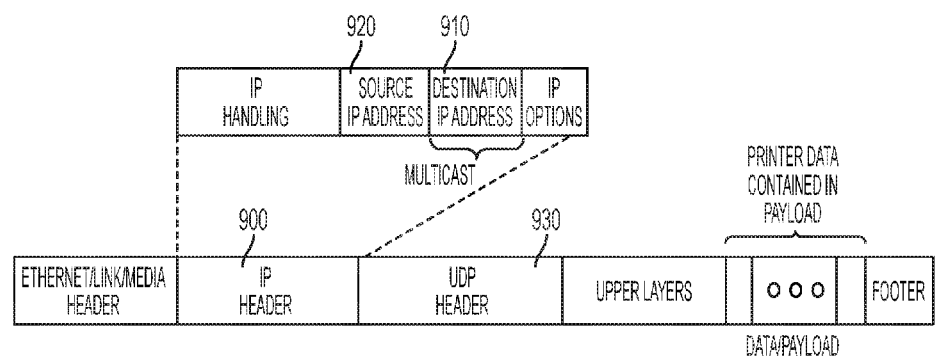
FIG. 9 is a network packet diagram showing an unmodified IP address in the Network layer header according to an exemplary embodiment of the invention.

Also, while the MAC address can be associated with a specific user device, the multicast Internet Protocol (IP) address 910 should be preserved and set to the standard multicast address, as expected by the Airprint protocol (as shown in FIG. 9). The remainder of the formed packet should also conform to the Airprint expected network protocol. This includes IP header 900 and Source IP address 920, the user datagram protocol (UDP) implementation in transport header 930, and the software port as expected by the Airprint protocol. Also the Domain Name Service-Service Discovery (DNS-SD) implementation, as described below, should conform to ZeroConfiguration and Network Working Group (NWG) standards. Lower level packet manipulation can be achieved by using the application interface (API) function calls of the standard WinPCap packet capture and transmission tool. This effectively preserves the expected Airprint send and response protocol while targeting a specific user device or devices. Hence, to a user device, it appears as if the server is sending out a normal Airprint response packet, except that the MAC address has been changed from the default address to a device specific address (i.e. a directed multicast message).

Moving on to the protocols themselves, the solution also utilizes the open source nature of ZeroConfig (during service discovery) by creating a custom implementation and adding service visibility control features as stated above. In this manner the central server responds to service requests exactly as the user device expects, while at the same time allowing for controlled responses of the requested service. This results in all service devices (e.g. Airprint printer service devices) being published using a proxy since their native Airprint feature is turned off. In other words, the Airprint disabled printer must communicate through a server or workstation proxy to advertise its services to user devices.

In regard to the software functions themselves, a Domain Name Service-Service Discovery (DNS-SD) message handler relies on a ZeroConfig implementation that is adapted to publish services to a restricted set of user devices, as implemented in the embodiment. This is meant to replace Bonjour during the print discovery step of the process. At the heart of the functionality, to limit service visibility, is the use of raw sockets to send the directed multicast packet directly to the user device. The DNS-SD message handler first listens to all network traffic using the multicast IP address 224.0.0.251. While it listens to all network traffic, the handler only reacts to DNS-SD queries and from those determines whether or not to respond (using the user assignments/policies security setup).

In terms of the lower level layers of the directed multicast response packet, the following programming code can be used to assemble the Ethernet and IP layers (where the IP address would be set to 224.0.0.225):

```
// Source IP, source port, target IP, target port from the command line arguments
CMDns::RetVal CMDns::SendRaw(MDnsClient *pClient, u__int8__t *pBuffer, u__int16__t sizeBuffer)
{
    .
    .
    .
    //is mac address already stored for this client?
    if(pClient->GetMacAddress( ) == NULL)
    {
        //Client has no mac address already stored, get it
```

```
            if(GetMacAddress(destmac, (IPAddr)pClient->GetAddress( )) != Ok)
                return NotFound;
            pClient->SetMacAddress(destmac);
    }
    else
    {
            memcpy(destmac, pClient->GetMacAddress( ), 6);
    }
    //make and pack the ethernet header
    memset(pktBuffer, 0, PCKT_LEN);
    IPAddr destip = pClient->GetAddress( );
    IPAddr srcip = m_localAddress.sin_addr.s_addr;
    ethernet_header ehdr;
    memcpy(ehdr.source, m_localMacAddress.addr, 6);
    memcpy(ehdr.dest,destmac, 6);
    ehdr.type = htons(0x0800);
    PackEthernetHdr(pktBuffer, PCKT_LEN,ehdr,totalUsed);
    u_int8_t *ipBuffer = &pktBuffer[totalUsed];
.
.
.

din.sin_addr.s_addr = inet_addr(IPV4_MCAST_GROUP);
.
.
.

// Source IP address, can use spoofed address here!!!
    ip.iph_sourceip = sin.sin_addr.s_addr;
    // The destination IP address
    ip.iph_destip = din.sin_addr.s_addr;
.
.
.

pcap_t* t;
        t = pcap_open(ifname.c_str( ) ,65535,PCAP_OPENFLAG_DATATX_UDP,1,NULL,Error);
        if(!t)
        {
            return CreatePcapFailed;
        }
        else
        {
            ConsoleOut("Raw packet sent OK!");
        }
        int ireturn = pcap_sendpacket(t,pktBuffer,totalUsed);
        pcap_close(t);
        return Ok;
}
```

In terms of the UDP and DNS-SD portions of the response packet, when communicating with environments such as iOS and OS X port 631 or 10631 can be used as part of the central server response to the user device. Also, a portion of the response includes service type ._ipp with the subtype ._universal for communication with a user device having an iOS environment. However, service type ._ipp without a subtype can be used for OS X and other environments. Also, all of the response data from the central server to the user device can be packaged into one or more packets when sent, depending on the operating system residing on the user device.

Along with the other message attributes, packets follow resource record (RR) descriptions when working with the DNS-SD messages as described in both the Network Working Group RFC 1035 and the Internet Engineering Task Force RFC 6763 publications. These additional attributes include using the "pointer" type record for the service, as referenced by RFC 6763, and an associated address, as referenced by RFC 1035. Use of the Network Working Group/Internet Engineering Task Force's protocol allows both the resource record and multicast IP layer to be preserved while the Ethernet layer is modified as described above.

Hence, due to initial discovery, security, subscription, and secondary discovery processes, the system and method can present to a user any services the user is authorized to view. The service request process described below completes the end to end service process.

To complete a service such as printing a document, the user can now select a printer from the list available on their device. This also completes the message path as shown in FIG. 5. In a disclosed embodiment, once the user selects a printer the print job is sent back to the servers as messages 520 and 530, then forwarded on to the target printer (or to an alternate end device) as message 540, as seen FIG. 5. In the case of a local printer, the job is sent to the workstation on which the printer resides and then is forwarded over the local connection (e.g. USB). While both tasks rely on the unaltered Internet Printing Protocol to deliver the print job to a printer or forwarding device, all visibility control, security handling, message formation, job routing, and formatting is handled by the system's servers encompassing the present invention. Hence, the system and method provide controlled service visibility (where none had previously existed) and allow for service execution from a user device for only the intended user or users. It should be noted that embodiments may be implemented using some combination of hardware and/or software. It should be further noted that a computer-readable medium that comprises computer-executable instructions for execution in a processor may be configured to store various embodiments. The computer-readable medium may include volatile memories, non-volatile memories, flash memories, removable discs, non-removable discs and so on. In addition, it should be noted that various electromagnetic signals such as wireless signals, electrical signals carried over a wire, optical signals carried over optical fiber and the like may be encoded to carry computer-executable instructions and/or computer data that embodiments of the invention on e.g., a communication network.

Embodiments may be embodied in many different ways as a software component. For example, it may be a stand-alone software package, or it may be a software package incorporated as a "tool" in a larger software product, such as, for example, an information technology management product. It may be downloadable from a network, for example, a website, as a stand-alone product or as an add-in package for installation in an existing software application. It may also be available as a client-server software application, or as a web-enabled software application.

While various embodiments of the present invention have been described above, it should be understood that they have been presented by way of example only, and not limitation. For example, embodiments of the invention may be used with any ZeroConfig service, such as Airplay, Bonjour, Avahi, etc. Thus, the breadth and scope of the present invention should not be limited by any of the above-described exemplary embodiments, but should instead be defined only in accordance with the following claims and their equivalents.

What is claimed:

1. A method of providing computer network based limited visibility service discovery, comprising:
   disabling a broadcast function of a service device when the service device includes a broadcast service advertisement function;
   configuring a service to be recognized by a server via an initial service discovery request;
   directing the server to wait for a subsequent service discovery request from a user device;
   upon receipt of the subsequent service discovery request, verifying with the server that the requesting user device is authorized or not authorized to view services available via the network;
   responding to a user device service request based on a result of the authorization check, where a response is sent from the server to only the said requesting user device if authorized to view the service, and a response is not sent to said requesting user device if not authorized to view the service;
   upon receipt of user selection of the service to be executed, processing the service request with a service handler by receiving, processing, and forwarding the request to a service device or further service forwarding device.

2. The method of providing computer network based limited visibility service discovery according to claim 1, wherein said broadcast function is an Airprint service that is included with the service device.

3. The method of providing computer network based limited visibility service discovery according to claim 1, wherein one or more said initial service discovery requests originate from an agent on the user device.

4. The method of providing computer network based limited visibility service discovery according to claim 1, wherein said subsequent service discovery request originates from a user device after the user opens a service menu from an application, and where said server receives the request.

5. The method of providing computer network based limited visibility service discovery according to claim 4, wherein said server response message contains a Media Access Control (MAC) address specific to the service requesting device, and where a protocol multicast MAC address is replaced with said device specific MAC address.

6. The method of providing computer network based limited visibility service discovery according to claim 4, wherein said server response contains a multicast Internet Protocol (IP) address that is compatible with a printing protocol implementation.

7. The method of providing computer network based limited visibility service discovery according to claim 4, wherein said server response message inserts a Media Access Control (MAC) address specific to the service requesting device but preserves an Internet Protocol multicast address conforming to the Bonjour protocol.

8. The method of providing computer network based limited visibility service discovery according to claim 4, wherein said server response includes a message indicating that authorized printers were found if the requesting user is authorized for any of the service devices known by the server, and where the Media Access Control (MAC) response address is the specific user device's MAC address, and where the Internet Protocol (IP) multicast address is preserved in the response packet.

9. The method of providing computer network based limited visibility service discovery according to claim 1, wherein said server authorization check is performed by comparing stored user authorization configurations to user information from the service request.

10. The method of providing computer network based limited visibility service discovery according to claim 1, wherein said server response includes a service list containing at least one service name that identifies the service device as a resource that a requesting user has authorization to see, if any authorized devices exist on the network.

11. A system for providing computer network based limited visibility service discovery, comprising:
    a processor;
    a memory;
    one or more service devices which have their broadcast service discovery function disabled for the service devices that include a multicast service advertisement function;
    a configuring module which configures one or more services to be recognized by a server via an initial service request;
    a central server agent which directs the server to wait for a subsequent service discovery request from a user device; which, once a request is received, checks if the requesting user is authorized or is not authorized to see one or more services available via the network; and which responds to one or more user service requests based on the result of one or more user authorization checks; and
    a service handler that, upon user selection of the service to be executed, processes the service request by receiving, processing, and forwarding the request to a service device or further service forwarding device.

12. The system of providing computer network based limited visibility service discovery according to claim 11, wherein said broadcast function is an Airprint service that is included with the service device.

13. The system of providing computer network based limited visibility service discovery according to claim 11, wherein one or more said initial service discovery requests originate from an agent on the user device.

14. The system of providing computer network based limited visibility service discovery according to claim 11, wherein said subsequent service discovery request originates from a user device after the user opens a service menu from an application, and where said server receives the request.

15. The system of providing computer network based limited visibility service discovery according to claim 14, wherein said server response message contains a Media Access Control (MAC) address specific to the service requesting device, and where a protocol multicast MAC address is replaced with said device specific MAC address.

16. The system of providing computer network based limited visibility service discovery according to claim 14, wherein said server response contains a multicast Internet Protocol (IP) address that is compatible with Apple's printing protocol implementation.

17. The system of providing computer network based limited visibility service discovery according to claim 14, wherein said server response message inserts a Media Access Control (MAC) address specific to the service requesting device but preserves an Internet Protocol multicast address conforming to the Bonjour protocol.

18. The system of providing computer network based limited visibility service discovery according to claim 14, wherein said server response includes a message indicating that authorized printers were found if the requesting user is authorized for any of the service devices known by the server, and where the Media Access Control (MAC) response address is the specific user device's MAC address, and where the Internet Protocol (IP) multicast address is preserved in the response packet.

19. The system of providing computer network based limited visibility service discovery according to claim 11, wherein said server authorization check is performed by comparing stored user authorization configurations to user information from the service request.

20. The system of providing computer network based limited visibility service discovery according to claim 11, wherein said server response includes a service list containing at least one service name that identifies the service device as a resource that a requesting user has authorization to see, if any authorized devices exist on the network.

* * * * *